United States Patent [19]
Nakamura

[11] Patent Number: 5,306,998
[45] Date of Patent: Apr. 26, 1994

[54] PROTECTION CONTROL CIRCUIT FOR A VARIABLE SPEED HOISTING DEVICE

[75] Inventor: Youji Nakamura, Fukuoka, Japan

[73] Assignee: Mitsubishi Denki K. K., Tokyo, Japan

[21] Appl. No.: 934,259

[22] Filed: Aug. 25, 1992

[30] Foreign Application Priority Data

Aug. 30, 1991 [JP] Japan .................. 3-219495

[51] Int. Cl.$^5$ .......................................... H02H 7/08
[52] U.S. Cl. ........................... 318/806; 318/799; 318/461; 361/23; 361/88
[58] Field of Search ............... 318/138, 254, 439, 800, 318/802, 803, 805, 807, 461, 465, 806, 476, 743, 799; 361/23, 31, 87, 91, 30, 89, 78, 88, 92

[56] References Cited

U.S. PATENT DOCUMENTS

| | | | |
|---|---|---|---|
| 3,971,971 | 7/1976 | Wycoff | 318/743 |
| 4,292,577 | 9/1981 | Cesarz et al. | 318/802 |
| 4,546,293 | 10/1985 | Peterson et al. | 318/254 |
| 4,953,053 | 8/1990 | Pratt | 361/31 |
| 4,965,847 | 10/1990 | Jurkowski et al. | 318/803 |

FOREIGN PATENT DOCUMENTS 154110  8/1985  Japan .
163290  6/1990  Japan .

Primary Examiner—Bernard Roskoski
Assistant Examiner—John W. Cabeca
Attorney, Agent, or Firm—Sughrue, Mion, Zinn, Macpeak & Seas

[57] ABSTRACT

A protection control circuit for a variable speed hoisting device driven by an induction motor includes, in addition to the inverter unit 1 for supplying power to the induction motor 2 and relays, a rotary encoder 16 and an abnormality detector 15. When the rotary encoder 16 does not generate output in spite of the fact that an operation instruction is input, the abnormality detector 15 opens the normally closed contact 15$b$2 to stop the inverter unit 1 and turns on the invertor abnormality display lamp 15$d$1 and rotation detector abnormality display lamp 15$d$2.

8 Claims, 6 Drawing Sheets

PROTECTION CONTROL CIRCUIT FOR A VARIABLE SPEED HOISTING DEVICE

BACKGROUND OF THE INVENTION

This invention relates to variable speed hoisting driven by an induction motor for hoisting a suspended load, and more particularly to protection control circuits for the induction motor thereof.

FIG. 5 is a circuit diagram showing a conventional protection control circuit for a variable speed hoisting device, which is disclosed, for example, in Japanese Laid-Open Patent (Kokai) No. 62-46879. An inverter unit 1 is supplied with a three-phase alternating current from current supply lines R, S, and T. A hoisting induction motor 2 is supplied with the three-phase alternating current from the inverter unit 1 and rotates in a direction and at a speed corresponding to the phase rotational direction and the frequency, respectively, of the three-phase alternating current supplied thereto. A break coil 3 activates a break to lock the induction motor 2, when the current supply thereto stops. The break coil 3 releases the break to allow a free rotation of the induction motor 2, when current is supplied thereto.

When a normally open push button switch for upward operation PBu is pushed to the first level, the first contact PBul is closed. When it is pushed to the second level, the second contact PBuh is closed. When a normally open push button switch for downward operation PBd is pushed to the first level, the first contact PBdl is closed. When it is pushed to the second level, the second contact PBdh is closed. By the way, the normally open push button switch for upward operation PBu and the normally open push button switch for downward operation PBd are mechanically interlocked such that they cannot be pushed in simultaneously.

When excited, an electromagnetic relay coil 4 closes the normally open contacts 4a1 and 4a2. When the normally open contact 4a1 is closed, the inverter unit 1 supplies a three-phase alternating current upward hoisting direction. Similarly, when excited, an electromagnetic relay coil 5 closes the normally open contact 5a1 and the normally open contact 5a2. When the normally open contact 5a1 is closed, the inverter unit 1 outputs a three-phase alternating current in the downward hoisting direction. When the inverter unit 1 is outputting the three-phase alternating current, an electromagnetic relay coil 6 is excited to close a normally open contact 6a1. Further, when excited, an electromagnetic relay coil 7 closes normally open contacts 7a1 and 7a2 to supply current to the break coil 3 such that the break for stopping the induction motor 2 is released.

A high-speed level setter 8 and a low-speed level setter 9 consist of a variable resistor respectively. An electromagnetic relay coil 11 is excited when either the normally open push button switch for upward operation PBu or the normally open push button switch for downward operation PBd is pushed to the second level. Then, the normally open contacts 11a1 and 11a2 are closed and the normally closed contacts 11b1 and 11b2 are opened, so as to change over the speed setting from that by the low-speed level setter 9 to that by the high-speed level setter 8.

When excited, an electromagnetic relay coil 13 closes the normally open contacts 13a1 and 13a2. The normally open contact 13a1 is a self-keeping contact which is kept closed once the electromagnetic relay coil 13 is excited by the closure of the normally open contact 5a2. When the normally open contact 13a2 is closed together with the normally open contact 4a1, the inverter unit 1 outputs a three-phase alternating current to the induction motor 2 in the phase rotational direction of upward hoisting operation. A rotational speed indicating generator 14 (rotation detector) generates a DC voltage having a voltage level and a polarity corresponding to the rotational speed and rotational direction, respectively, of the induction motor 2. An abnormality detector 15 is supplied with the outputs of the rotational speed indicating generator 14 and the normally open contact 4a2. Assume that, in spite of the fact that the normally open contact 4a2 is closed (namely, the upward hoisting operation is instructed by the operator), the polarity of the DC voltage of the rotational speed indicating generator 14 corresponds to the downward hoisting direction of the induction motor 2. Then, the abnormality detector 15 judges that the suspended load which should be hoisted up is falling abnormally, and thus opens the normally closed contact 15b1, thereby stopping the upward hoisting operation as described below.

Next the method of operation of the protection control circuit for the variable speed hoisting device of FIG. 5 is described by referring to FIG. 6.

FIG. 6 is a diagram showing the variation of the output frequency of the inverter of the variable speed hoisting device. When the current supply lines R, S, and T are connected to the respective power source lines, the electromagnetic relay coil 13 is not in the self-keeping state. When, however, the normally open push button switch for downward operation PBd is pushed in, the electromagnetic relay coil 5 is excited to close the normally open contact 5a2. Then, since the normally closed contact 15b1 of the abnormality detector 15 is closed, the electromagnetic relay coil 13 is excited to close the normally open contact 13a1, to be retained in the self-keeping state. Then, even when the normally open push button switch for downward operation PBd is released and the normally open contact 5a2 is opened, the normally open contacts 13a1 and 13a2 are kept closed.

When, under this circumstance, the normally open push button switch for upward operation PBu is pushed to the first level at time point $t_1$, the normally open contact 4a1 of the electromagnetic relay coil 4 is closed. Since the normally open contact 13a2 is already closed by the self-keeping electromagnetic relay coil 13, a signal indicating an instruction for an upward hoisting operation is input to the inverter unit 1. Thus, the frequency of the inverter unit 1 begins to increase at a predetermined rate from 0 Hz to $f_2$ Hz set by the low-speed level setter 9. When the frequency reaches at $f_1$ Hz at time point $t_2$, the inverter unit 1, detecting the frequency by means of a built-in frequency detector (not shown), starts to supply the three-phase alternating current to the induction motor 2 and, simultaneously therewith, excites the electromagnetic relay coil 6. As a result, the normally open contact 6a1 is closed and the electromagnetic relay coil 7 is excited, thereby closing the normally open contacts 7a1 and 7a2. Thus, the break coil 3 is supplied with a current, and releases the break of the induction motor 2. The induction motor 2 thereupon starts to rotate in the upward hoisting operation and gradually gains speed.

When the frequency of the inverter unit 1 reaches a $f_2$ Hz set by the low-speed level setter 9 at time point $t_3$, the inverter unit 1 stops increasing the frequency thereof. Thus, the induction motor 2 is operated at a fixed low speed. When the normally open push button switch for upward operation PBu is pushed to the second level at time point t₄, the electromagnetic relay coil 11 is excited to close the normally open contacts 11a1 and 11a2 and to open the normally closed contacts 11b1 and 11b2. Thus, the low-speed level setter 9 is separated from the inverter unit 1, while the high-speed level setter 8 is connected thereto. As a result the inverter unit 1 starts to increase the frequency at a predetermined rate, from $f_2$ Hz set by the low-speed level setter 9 to $f_3$ Hz set by the high-speed level setter 8. Thus the induction motor 2 again accelerates.

When the frequency reaches at $f_3$ Hz at time point $t_5$, the inverter unit 1 stops increasing the frequency thereof. Thus, the induction motor 2 is operated at a fixed high speed. Thereafter, when the normally open push button switch for upward operation PBu is returned from the second to the first level at time point $t_6$, the speed setting is changed over from that by the high-speed level setter 8 to that by the low-speed level setter 9. As a result, the frequency of the inverter unit 1 begins to decrease at a predetermined rate. When the frequency reaches at $f_2$ Hz at time point $t_7$, the inverter unit 1 stops decreasing the frequency thereof. Thus the induction motor 2 is again operated at a fixed low speed.

Further, when the operator completely ceases to push the normally open push button switch for upward operation PBu, the electromagnetic relay coil 4 ceases to be excited and the normally open contact 4a1 is opened. As a result, the frequency of the inverter unit 1 begins to decrease toward 0 Hz at a predetermined rate. When the frequency reaches at $f_1$ Hz at time point $t_9$, the inverter unit 1 stops supplying the induction motor 2 and exciting the electromagnetic relay coil 6, thereby opening the normally open contact 6a1. As a result, the excitation of the electromagnetic relay coil 7 ceases, and the normally open contacts 7a1 and 7a2 are opened. Thus, the supply of current to the break coil 3 is stopped, and the break coil 3 activates the break to stop and lock the induction motor 2.

The downward hoisting operation which is initiated by pushing the normally open push button switch for downward operation PBd is similar to the upward hoisting operation described above. In the case of the downward hoisting operation, however, the electromagnetic relay coil 5 is excited to close the normally open contact 5a1, such that the induction motor 2 is rotated in the downward hoisting direction.

During the upward hoisting operation, the abnormality detector 15 operates as follows. As described above, when the electromagnetic relay coil 13 is self-keeping, the normally open contact 13a1 is closed and the upward hoisting operation can be performed. Assume that a suspended load which exceeds the rating of the hoisting device is suspended and the normally open push button switch for upward operation PBu is pushed to the first level. Then the induction motor 2 tries to start the upward hoisting operation. However, the torque of the induction motor 2 is insufficient to hoist the load, and the suspended load begins to fall. Then, the rotational speed indicating generator 14 outputs a voltage whose polarity corresponds to the downward hoisting direction. The normally open contact 4a2, however, is closed at this time, to inform the abnormality detector 15 that the upward hoisting operation is being performed. Thus, the abnormality detector 15 judges that the suspended load which should be hoisted up is abnormally failing, and hence opens the normally closed contact 15b1. As a result, the self-keeping action of the electromagnetic relay coil 13 is broken, and the normally open contact 13a2 is opened. In response thereto, the inverter unit 1 stops the upward hoisting operation.

When the induction motor 2 is thus stopped, the output from the rotational speed indicating generator 14 ceases and thus the abnormality detector 15 closes the normally closed contact 15b1. When the normally open push button switch for downward operation PBd is again pushed in, the electromagnetic relay coil 5 is excited to close the normally open contacts 5a1 and 5a2. As a result, the electromagnetic relay coil 13 is again brought into the self-keeping state, and the normally open contact 13a2 is closed. Thus, the upward hoisting operation again becomes feasible.

The above conventional variable speed hoisting device, however, has the following disadvantage. When the rotational speed indicating generator 14 stops generating its output due to a failure thereof or a disconnection from the abnormality detector 15, etc., the abnormality detector 15 becomes incapable of detecting the abnormal operation of the hoisting device such as the abnormal fall of the suspended load.

SUMMARY OF THE INVENTION

It is therefore an object of this invention to provide a variable speed hoisting device which is capable of detecting the abnormality even when the whole or a part of the output of the rotation detector for detecting the rotational speed and direction of the induction motor ceases due to a failure or a disconnection thereof.

The above object is accomplished in accordance with the principle of this invention by a protection control circuit for controlling an operation of a variable)e speed hoisting device driven by an induction motor, the protection control circuit which comprises inverter unit means for supplying a power to the induction motor of the variable speed hoisting device to control a rotational direction and a speed of the induction motor; rotation detector means for detecting a rotation of the induction motor and for generating an output in response to a detection of rotation; operation instruction means for inputting an operation instruction to the inverter unit to start supplying power to the induction motor, the operation instruction means outputting an operation signal when the operation instruction is input; abnormal operation detector means, coupled to the operation instruction means and the rotation detector means, for generating an abnormal operation signal when although the operation signal is generated, the output of the rotation detector means is not supplied.

According to another aspect of this invention, the protection control circuit for controlling a variable speed hoisting device driven by an induction motor comprises: inverter unit means for supplying a power to the induction motor to control a direction and a speed of the induction motor; rotation detector means for detecting a rotation of the induction motor and for generating at least two signals in response to a detection of rotation; and abnormal operation detector means, coupled to the rotation detector means, for detecting an abnormal operation of the rotation detector means when only one of the two signals of distinct phases is supplied from the rotation detector means.

Preferably, the rotation detector means comprises a rotary encoder generating two pulse signals of distinct phases.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
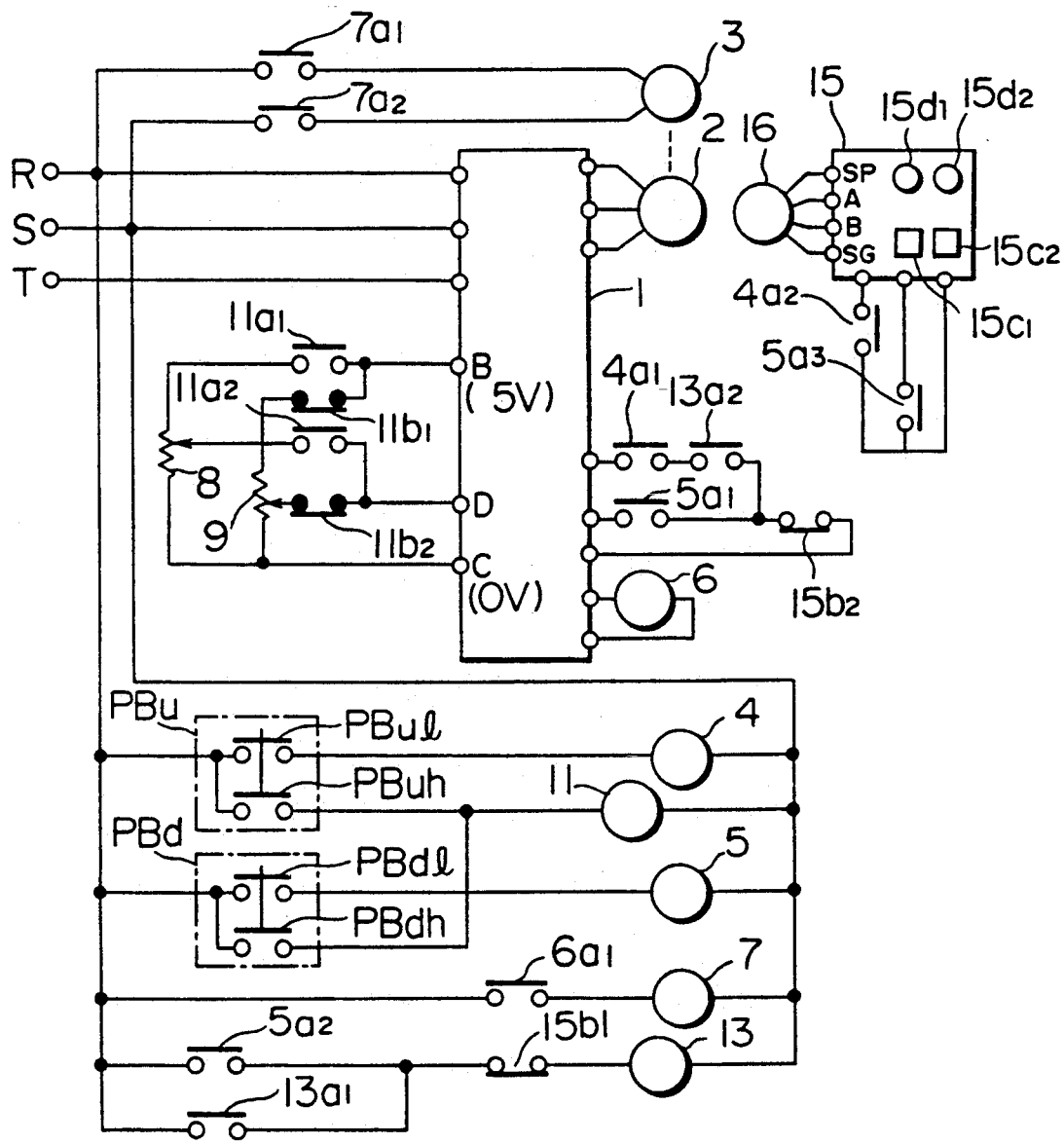
FIG. 1 is a circuit diagram showing the protection control circuit for a variable speed hoisting device according to an embodiment of this invention.

FIG. 1 is a circuit diagram showing the protection control circuit for a variable speed hoisting device according to an embodiment of this invention. In FIG. 1, the parts 1 through 9, 11, and 13 and the normally open push button switch for upward operation PBu and normally open push button switch for downward operation PBd are similar to those of FIG. 5 described above. However, instead of the rotational speed indicating generator 14, a rotary encoder 16 is provided as a rotation detector (rotational speed detector) for the induction motor 2, to output two pulse signals of distinct phases (A-phase and B-phase signals) having a phase difference and frequency corresponding to the rotational direction and the rotational speed, respectively, of the induction motor 2. To the abnormality detector 15 is input, in addition to the output of the normally open contact 4a2 operated by the electromagnetic relay coil 4, the output of the normally open contact 5a3 operated by the electromagnetic relay coil 5. Thus, when the operation of the induction motor 2 is instructed by the operator, either the normally open contact 4a2 or the normally open contact 5a3 is closed. Namely, when the operator instructs the upward hoisting operation by pushing the normally open push button switch for upward operation PBu, the electromagnetic relay coil 4 is energized to close the normally open contact 4a2, and the abnormality detector 15 is thus informed that the upward hoisting operation is instructed. On the other hand, when the operator instructs the downward hoisting operation by pushing the normally open push button switch for downward operation PBd, the electromagnetic relay coil 5 is energized to close the normally open contact 5a3, and the abnormality detector 15 is thus informed that the downward hoisting operation is instructed. If no input is supplied from the rotary encoder 16 even though either the normally open contact 4a2 or the normally open contact 5a3 is closed, the abnormality detector 15 judges that either the inverter unit 1 or the rotary encoder 16 is in failure, and opens the normally closed contacts 15b1 and 15b2.

The normally closed contact 15b2 is connected in series with the normally open contacts 4a1 and 5a1. Thus, when the normally closed contact 15b2 is opened by the abnormality detector 15, the inverter unit 1 ceases to supply the three-phase alternating current to the induction motor 2.

The abnormality detector 15 is provided with a first abnormal operation memory 15c1 and a second abnormal operation memory 15c2 for storing the abnormal operation states of the hoisting device. Further, the abnormality detector 15 is provided with an invertor abnormality display lamp 15d1 and a rotation detector abnormality display lamp 15d2 for displaying the abnormality of the inverter unit 1 and the rotary encoder 16, respectively.

Figure 5:
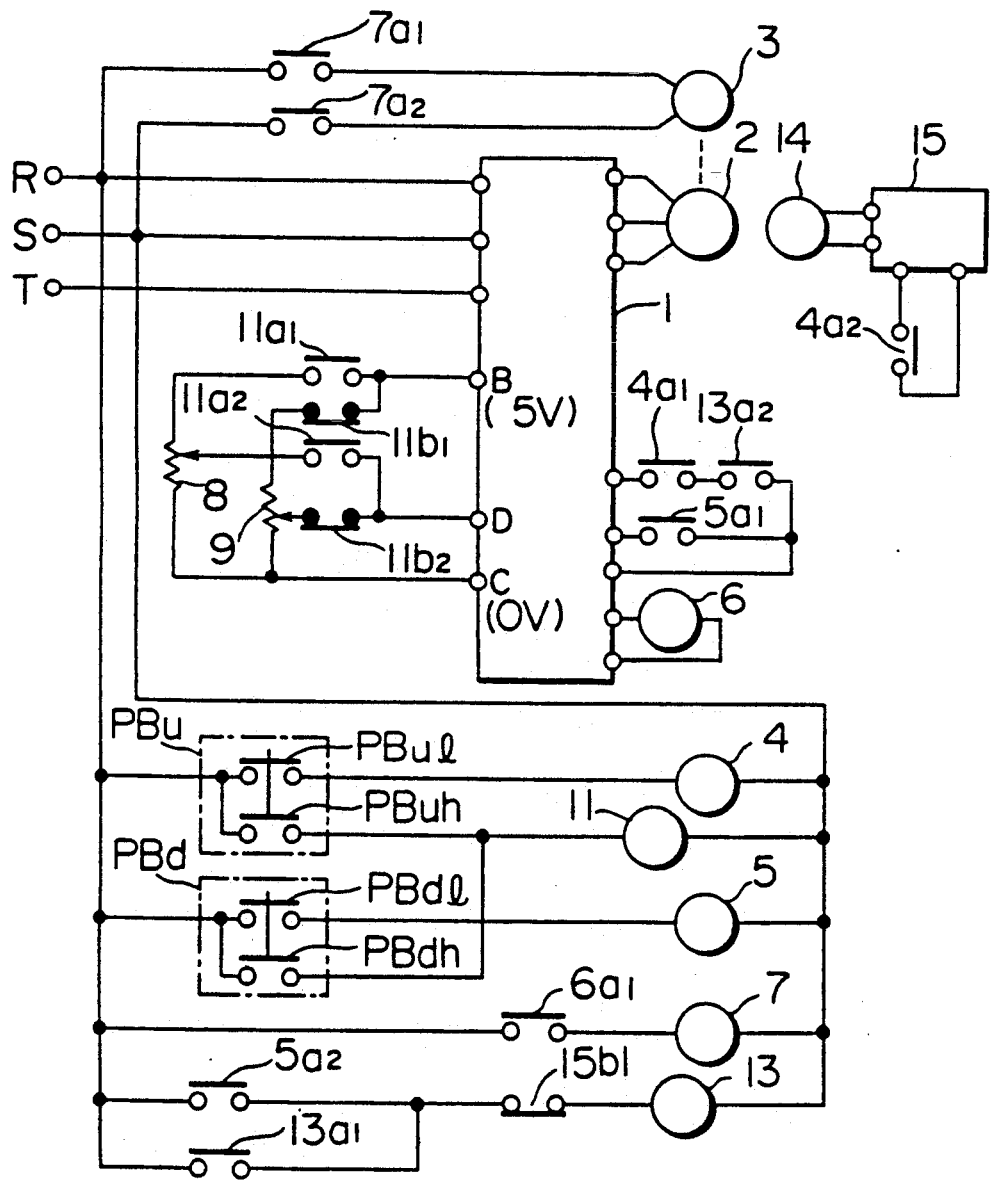
FIG. 5 is a circuit diagram showing a conventional protection control circuit for a variable speed hoisting device.
Figure 6:
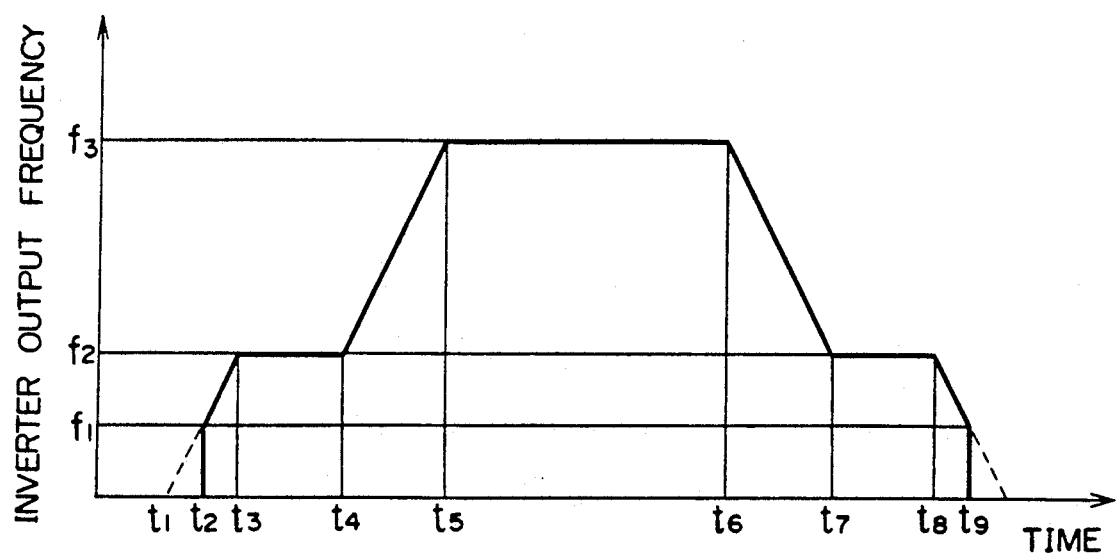
FIG. 6 is a diagram showing the variation of the output frequency of the inverter of the variable speed hoisting device.

The operation of the protection control circuit for the variable speed hoisting device of FIG. 1 is similar to that of the hoisting device of FIG. 5 described above, except for the operation of the abnormality detector 15 and the rotary encoder 16. Next, the operation of the protection control circuit for the variable speed hoisting device of FIG. 1 as distinct from the operation of the conventional device of FIG. 5 is described, taking the upward hoisting operation as an example.

Figure 2:
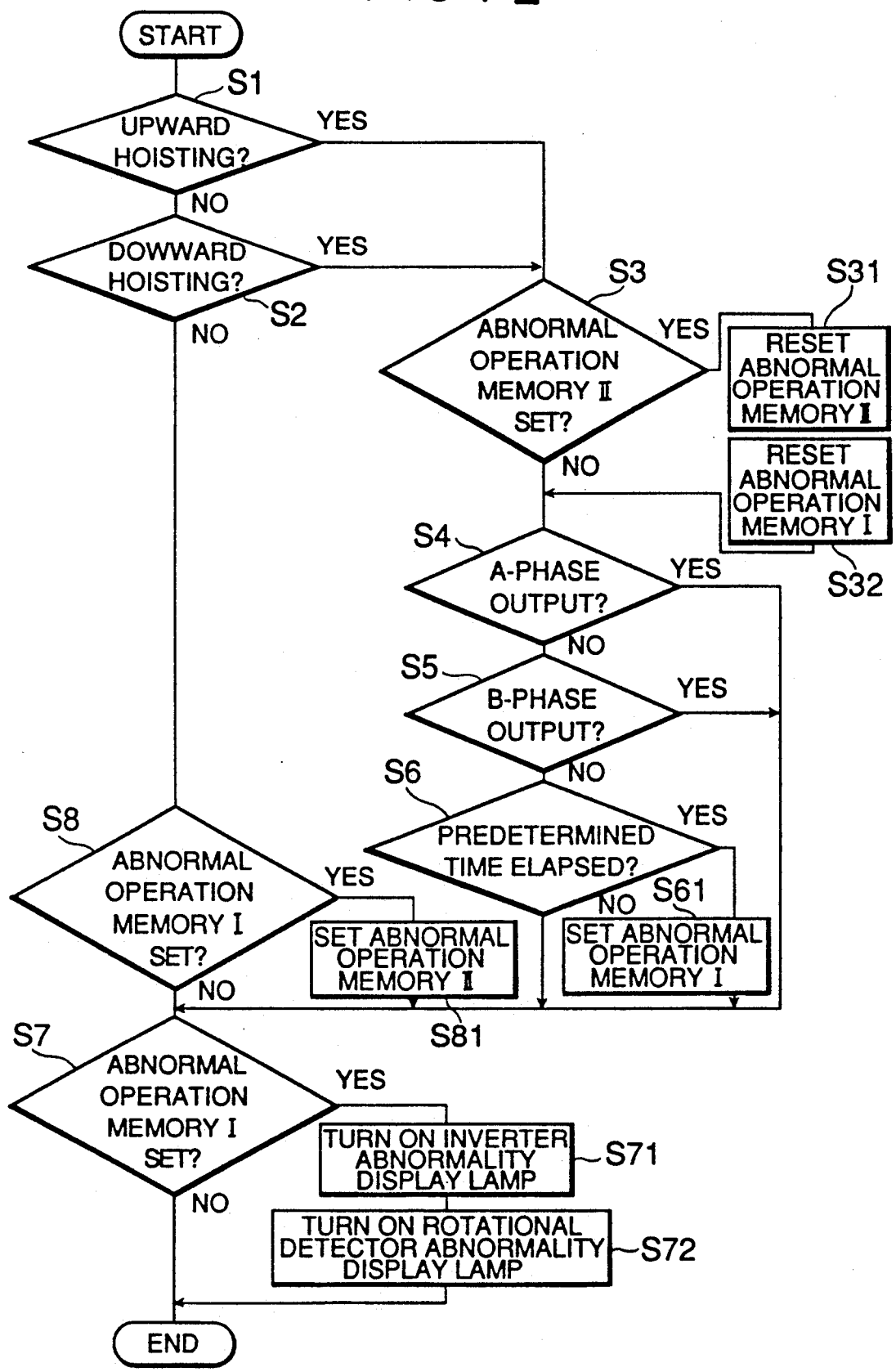
FIG. 2 is a flowchart showing the characteristic operation of the protection control circuit for the variable speed hoisting device of FIG. 1.

FIG. 2 is a flowchart showing the characteristic operation of the protection control circuit for the variable speed hoisting device of FIG. 1. At step S1, it is judged whether or not the upward hoisting instruction is input. It is assumed here that the operator pushes the normally open push button switch for upward operation PBu. Thus the normally open contact 4a2 is closed to notify the abnormality detector 15 that the upward hoisting operation is instructed by the operator. Thus the judgment is affirmative at step S1, and the execution proceeds to step S3. (If the judgment is negative at step S1, the execution proceeds to step S2 where it is judged whether or not the downward hoisting instruction is input by the operator.)

At step S3, it is judged whether or not the second abnormal operation memory 15c2 is set. Normally, the first abnormal operation memory 15c1 and second abnormal operation memory 15c2 are reset, and hence the judgment is negative at step S3. Thus, the execution proceeds to the judgments at steps S4 through S6, to decide whether or not the signals from the rotary encoder 16 are being input. (If the judgment is affirmative at step S3, the execution proceeds to steps S31 and S32, where the first abnormal operation memory 15c1 and the second abnormal operation memory 15c2 are reset, respectively.)

At step S4 and step S5, the abnormality detector 15 determines whether or not the A- and B-phase signals of the electromagnetic relay coil 6 are supplied from the rotary encoder 16. Namely, at step S4 and step S5, respectively, it is judged whether or not the A-phase signal and the B-phase signal are output from the rotary encoder 16. If either signal is output from the rotary encoder 16 and hence the judgment is affirmative either at step S4 or step S5, the execution proceeds step S7. Under normal condition, the induction motor 2 starts to rotate in the upward hoisting direction soon after the normally open contact 4a1 is closed, and the rotary encoder 16 outputs the two pulse signals of distinct phases (A- and B-phase signals). Thus, the execution proceeds directly to step S7, and the first abnormal operation memory 15c1 is retained in the reset state. At step S7 it is judged whether or not the first abnormal operation memory 15c1 is set. Thus, the judgment is negative at step S7. The each execution cycle of the abnormality determination procedure of FIG. 2 is terminated without energizing the invertor abnormality display lamp 15d1 or the rotation detector abnormality display lamp 15d2. Further, the normally closed contacts 15b1 and 15b2 are not opened. Thus, the induction motor 2 keeps on operating normally.

On the other hand, when both the A- and B-phase signals of the rotary encoder 16 are not detected, the judgments at step S4 and step S5 are both negative, and the execution proceeds to step S6, where it is judged whether or not a predetermined time has elapsed without detection of either the A- and B-phase signal. The supply of the output signals from the rotary encoder 16 to the abnormality detector 15 stops when, for example, the induction motor 2 does not rotate due to the failure of the inverter unit 1, or when power source wirings from the abnormality detector 15 to the rotary encoder 16 are disconnected. Then, the judgments step S4 and step S5 are both negative, and the judgment at step S6 is affirmative. Thus, the execution proceeds to step S61, where the abnormality detector 15 sets the first abnormal operation memory 15c1. Thereafter the execution proceeds to step S7. Under this circumstance, the judgment is affirmative at step S7. Judging that either the inverter unit 1 or the rotary encoder 16 is in failure, the abnormality detector 15 turns on the invertor abnormality display lamp 15d1 and the rotation detector abnormality display lamp 15d2 at step S71 and step S72, respectively, and at the same time, opens the normally closed contacts 15b1 and 15b2, to excite the break coil 3 and stop the output of the inverter unit 1.

If, thereupon, the operator ceases to push the normally open push button switch for upward operation PBu, the execution cycle of the procedure of FIG. 2 then proceeds from step S1 to step S2 and thence to step S8, since neither the upward hoisting operation or the downward hoisting operation is instructed. At step S8, it is judged whether or not the first abnormal operation memory 15c1 is set. Since the first abnormal operation memory 15c1 is set at this time, the execution proceeds to step S81, where the second abnormal operation memory 15c2 is set and the normally closed contacts 15b1 and 15b2 are closed. As a result, when the normally open push button switch for upward operation PBu is pushed again (after repairing the inverter unit 1 or the rotary encoder 16 and confirming that the device is functioning well), the execution cycle of FIG. 2 effected by the abnormality detector 15 proceeds through step S1 and step S3 to step S31 and step S32, where the first abnormal operation memory 15c1 and the second abnormal operation memory 15c2 are reset, respectively. Thus, the storage of the abnormality is cleared, and the abnormality detector 15 repeats the procedure as described above after step S4.

When the normally open push button switch for downward operation PBd is pushed, the normally open contact 5a3 is closed instead of the normally open contact 4a2, such that normally the execution proceeds from step S1 to step S2 and thence to step S3. Otherwise, the method of operation is the same as the case where the normally open push button switch for upward operation PBu is pushed.

Figure 3:
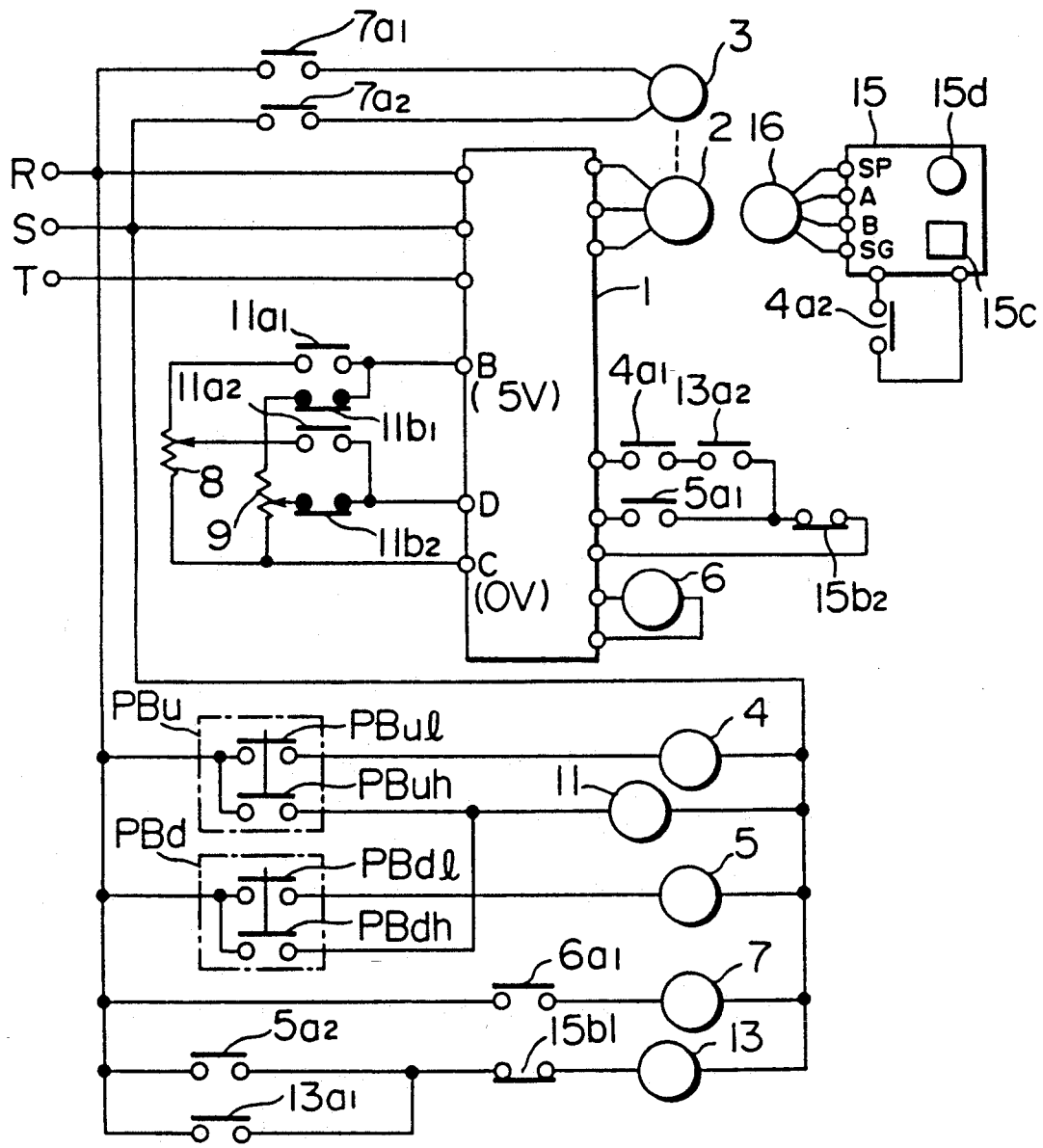
FIG. 3 is a circuit diagram showing the protection control circuit for another variable speed hoisting device according to this invention.

FIG. 3 is a circuit diagram showing the protection control circuit for another variable speed hoisting device according to this invention. In FIG. 3, the Parts 1 through 9, 11, and 13 and the normally open push button switch for upward operation PBu and the normally open push button switch for downward operation PBd are similar to those of FIG. 5 described above. However, instead of the rotational speed indicating generator 14, a rotary encoder 16 is provided as a rotation detector (rotational speed detector) for the induction motor 2, to output two pulse signals of distinct phases (A-phase and B-phase signals) having a phase difference and a frequency corresponding to the rotational direction and the rotational speed, respectively, of the induction motor 2. If only one of the two signals (A- and B-phase signals) is supplied from the rotary encoder 16, the abnormality detector 15 judges that the rotary encoder 16 is in failure, and opens the normally closed contacts 15b1 and 15b2.

The normally closed contact 15b2 is connected in series with the normally open contacts 4a1 and 5a1. Thus, when the normally closed contact 15b2 is opened by the abnormality detector 15, the inverter unit 1 ceases to supply the power to the induction motor 2. Further, the abnormality detector 15 is provided with a rotation detector abnormality memory 15c for storing the abnormal operation states of the rotary encoder 16, and a rotation detector abnormality display lamp 15d for displaying the abnormality of the rotary encoder 16.

Except for that of the abnormality detector 15 and the rotary encoder 16, the operation of the variable speed hoisting device of FIG. 3 is similar to that of the conventional device described above. Next, the operation of the variable speed hoisting device of FIG. 3 as distinct from that of the conventional device is described. The description is made for the case of upward hoisting operation, concentrating on the operation of the abnormality detector 15.

Figure 4:
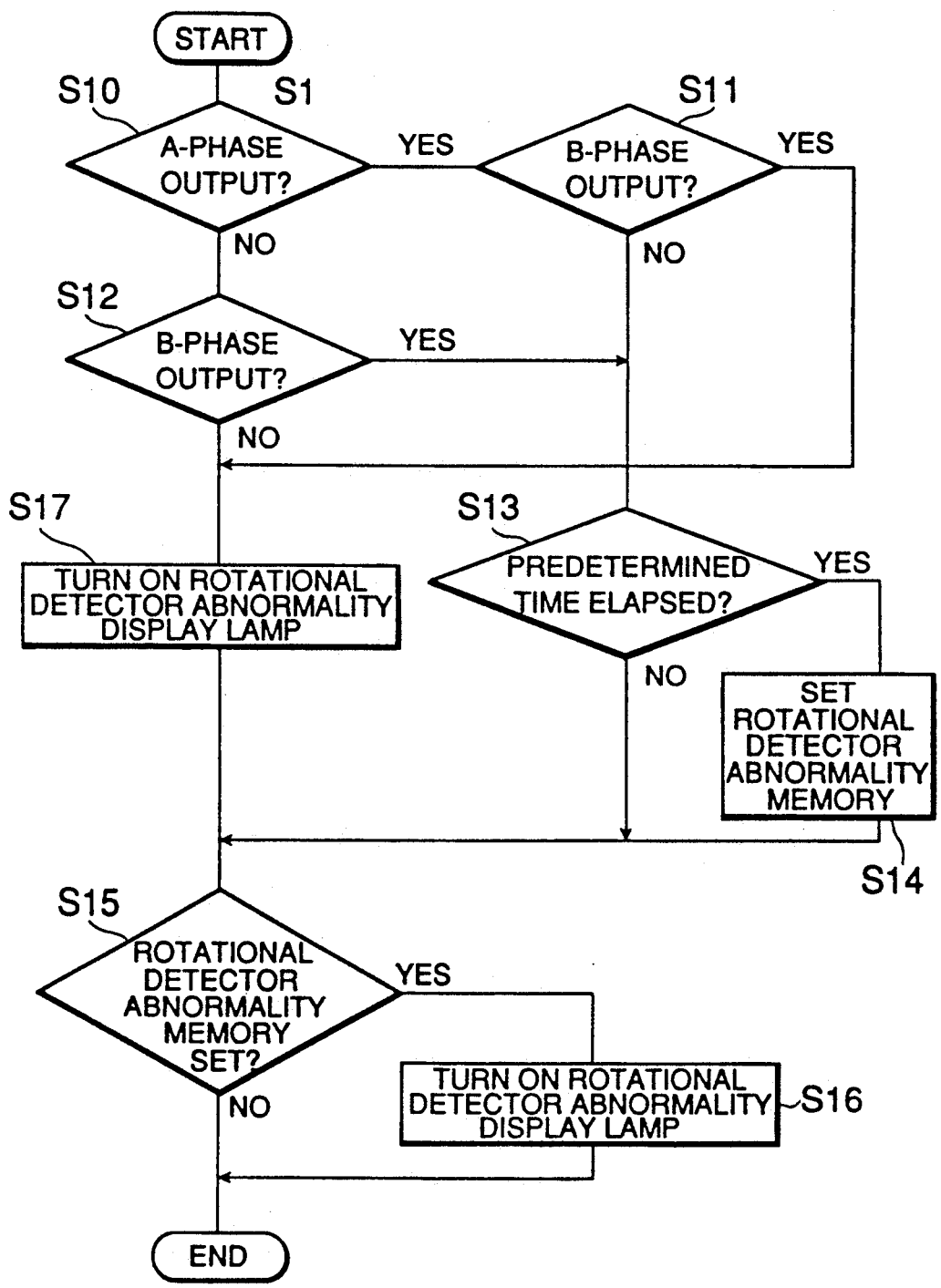
FIG. 4 is a flowchart showing the characteristic operation of the protection control circuit for the variable speed hoisting device of FIG. 3.

FIG. 4 is a flowchart showing the characteristic operation of the protection control circuit for the variable speed hoisting device of FIG. 3. When the normally open push button switch for upward operation PBu is pushed to close the normally open contact 4a1, the induction motor 2 begins to rotate in the upward hoisting direction and the rotary encoder 16 outputs the two pulse signals of distinct phases (the A- and B-phase signals) provided that the operation is normal. At step S10, it is judged whether or not the A-phase signal of the rotary encoder 16 is output. At step S11 and step S12, it is judged whether or not the B-phase signal of the rotary encoder 16 is output. Thus, if only one of the two signals is output from the rotary encoder 16, the execution proceeds to step S13. On the other hand, if both signals are output or neither of the two signals is output, the execution proceeds to step S17.

Under normal condition, both the A- and B-phase signals are output from the rotary encoder 16. Thus, the judgment is affirmative at step S10 and the execution proceeds to step S11, where the judgment is affirmative again. Thus, the execution proceeds to step S17, where the rotation detector abnormality memory 15c is reset. Thereafter, the execution proceeds to step S15, where it is judged whether or not the rotation detector abnormality memory 15c is set. Since the abnormality detector 15 is reset at step S17 under normal operation condition, the judgment is negative at step S15. Thus, the execution cycle of the procedure of FIG. 4 is normally terminated without turning on the rotation detector abnormality display lamp 15d. The normally closed contact 15b2 is not opened either.

When, on the other hand, only one of the A- or B-phase signals is supplied from the rotary encoder 16, either the judgment at step S10 is negative and that at step S12 is affirmative, or the judgment at step S10 is affirmative and that at step S11 is negative. Thus, after the judgments at steps S10, S11, and S12, the execution proceeds step S13. At step S13, it is judged whether or not a predetermined length of time has elapsed without simultaneous detection of both the A- and B-phase signals. When the A- and B-phase signals are not detected simultaneously for a predetermined length of time at step S13, the execution proceeds to step S14, where the abnormality detector 15 sets the rotation detector abnormality memory 15c to store the abnormality of the rotary encoder 16. Thereafter, the execution proceeds via step S15, where it is judged whether or not the rotation detector abnormality memory 15c is set. Thus, under this circumstance, the judgment is affirmative at step S15, and the execution proceeds to step S16, where the rotation detector abnormality display lamp 15d is turned on and the normally closed contact 15b2 is opened, to stop the operation of the inverter unit 1.

Thereafter, when the operator ceases to push the normally open push button switch for upward operation PBu to open the normally open contact 4a2, the execution cycle of the procedure of FIG. 4 proceeds as follows. The judgments at step S10 and step S12 become both negative, and the execution proceeds through step S10 and step S12 to step S17, where the abnormality detector 15 resets the rotation detector abnormality memory 15c and closes the normally closed contact 15b2. Thus, the storage of the abnormality is cleared, and, when the operator pushes the normally open push button switch for upward operation PBu after repairing the failing rotary encoder 16 and confirming the normal operation thereof, the operation as described above is repeated.

By the way, in the case of the embodiment of FIGS. 3 and 4, the step S17 may be dispensed with. Then, the operator resets the rotation detector abnormality memory 15c after confirming the normal operation of the rotary encoder 16.

The downward hoisting operation is initiated by pushing the normally open push button switch for downward operation PBd. The method of operation therefor is substantially the same as that for the upward hoisting operation initiated by pushing the normally open push button switch for upward operation PBu.

The above first and second embodiments relate respectively to the cases where both the two pulse signals of distinct phases of the rotary encoder 16 cease and where only one thereof ceases, due to a failure. These two cases have been described as relating to two distinct embodiments. However, using the circuit structure of FIG. 1, the methods of operation of FIGS. 2 and 4 may be combined. Then, the abnormality detector 15 may follow the procedure of FIG. 2 after that of FIG. 4.

Further, in the case of the above embodiments, the rotary encoder 16 is used as the rotation detector. However, in the case of the first embodiment, the rotational speed indicating generator may be used in its stead. In the case of the second embodiment, a rotation detector generating a plurality of outputs may replace the rotary encoder 16. It is noted that the abnormality detector 15 may be implemented by an integrated circuit or a microcomputer.

It is further noted that the second abnormal operation memory 15c2 of the first embodiment may be dispensed with. Then, the steps S21, S32, S8, and S81 are eliminated from the procedure of FIG. 2. After the first abnormal operation memory 15c1 is set, the operator is required to reset the first abnormal operation memory 15c1 after confirming the normal operation of the device. Furthermore, the contacts such as 4a2 and 5a3, which are implemented as contacts of electromagnetic relay coils in the case of the above embodiments, may be implemented by integrated circuits or transistors.

What is claimed is:

1. A protection control circuit for controlling an operation of a variable speed hoisting device driven by an induction motor, said protection control circuit comprising:
   inverter unit means for supplying power to said induction motor of said variable speed hoisting device to control a rotational direction and a speed of said induction motor;
   rotation detector means for detecting a rotation of said induction motor and for generating an output in response to a detection of rotation;
   operation instruction means for inputting an operation instruction, corresponding to one of an upward hoisting operation and a downward hoisting operation, to start supplying power to said induction motor, said operation instruction means generating an operation signal to said inverter unit when one of said hoisting operations is selected; and
   abnormal operation detector means, coupled to said operation instruction means and said rotation detector means, for generating an abnormal operation signal when said output of said rotation detector means is terminated while said operation signal is supplied to said inverter unit.

2. A protection control circuit for a variable speed hoisting device as claimed in claim 1, wherein said abnormal operation detector means generates said abnormal operation signal when said rotation detector means fails to generate an output signal for a predetermined length of time while said operation signal is supplied to said inverter unit.

3. A protection control circuit for a variable speed hoisting device as claimed in claim 1, wherein said rotation detector means comprises a rotary encoder generating two pulse signals of distinct phases.

4. A protection control circuit for a variable speed hoisting device as claimed in claim 3, wherein said abnormal operation detector means generates said abnormal operation signal when said rotary encoder fails to output said two pulse signals while said operation signal is supplied to said inverter unit.

5. A protection control circuit for controlling a variable speed hoisting device driven by an induction motor, said protection control circuit comprising:
   inverter unit means for supplying power to distinct phases of said induction motor to control a direction and a speed of said induction motor;
   rotation detector means for detecting a rotation of said induction motor and for generating at least two signals in response to a detection of rotation; and abnormal operation detector means, coupled to said rotation detector means, for detecting an abnormal operation of said rotation detector means when only one of said two signals of distinct phases is supplied from said rotation detector means.

6. A protection control circuit for a variable speed hoisting device as claimed in claim 5, wherein said abnormal operation detector includes: means for displaying abnormal operation of said rotation detector means; and means for stopping supply of power from said inverter unit means to said induction motor upon detecting said abnormal operation of said rotation detector means.

7. A protection control circuit for a variable speed hoisting device as claimed in claim 5, wherein said abnormal operation detector means detects abnormal operation of said rotation detector means when only one of said two signals of distinct phases is supplied from said rotation detector means for a predetermined length of time.

8. A protection control circuit for a variable speed hoisting device as claimed in claim 5, wherein said rotation detector means comprises a rotary encoder generating two pulse signals of distinct phases.

* * * * *